No. 740,827. PATENTED OCT. 6, 1903.
A. H. M. DRIVER & G. NORMAN.
METHOD OF TESTING FOR OR DETECTING AND CORRECTING FAULTS OR ERRORS IN TUBULAR ARTICLES.
APPLICATION FILED MAR. 21, 1903.
NO MODEL. 2 SHEETS—SHEET 2.
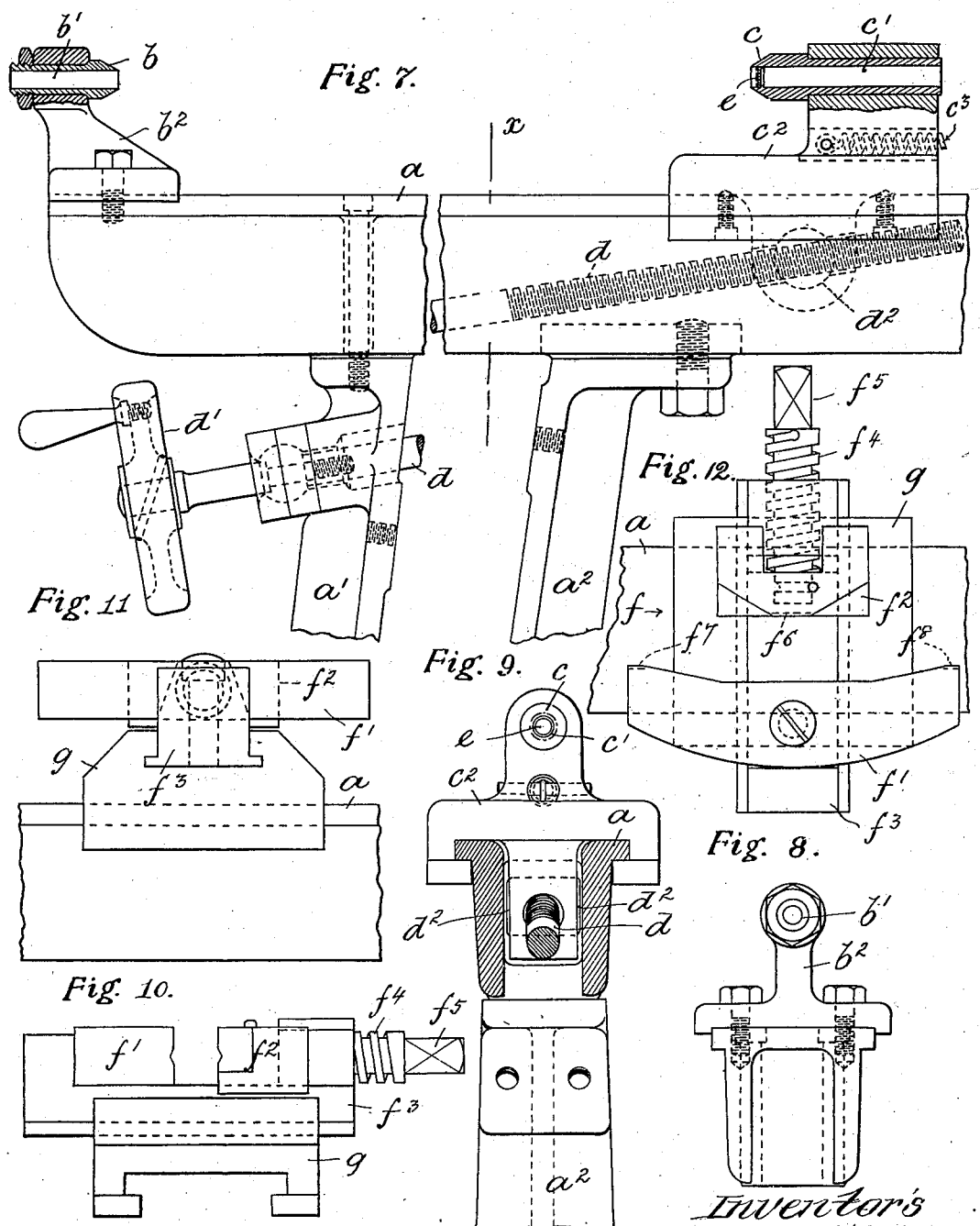

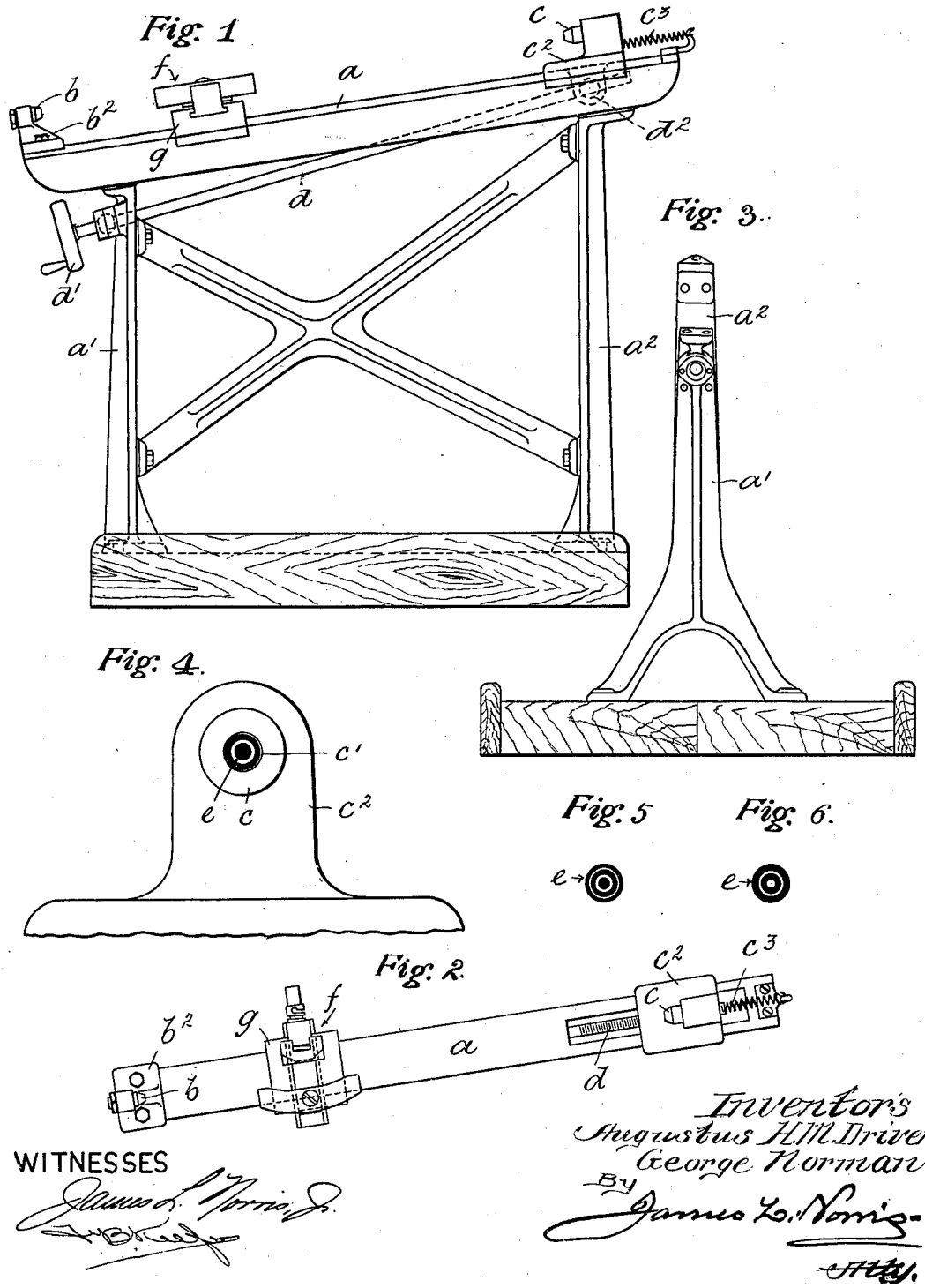

No. 740,827.

Patented October 6, 1903.

UNITED STATES PATENT OFFICE.

AUGUSTUS HENRY MURRAY DRIVER AND GEORGE NORMAN, OF BIRMINGHAM, ENGLAND.

METHOD OF TESTING FOR OR DETECTING AND CORRECTING FAULTS OR ERRORS IN TUBULAR ARTICLES.

SPECIFICATION forming part of Letters Patent No. 740,827, dated October 6, 1903.

Application filed March 21, 1903. Serial No. 148,980. (No model.)

*To all whom it may concern:*

Be it known that we, AUGUSTUS HENRY MURRAY DRIVER, chief engineer of the Birmingham Small Arms Company, Limited, and GEORGE NORMAN, assistant engineer of the Birmingham Small Arms Company, Limited, subjects of the King of Great Britain, residing at Small Heath, Birmingham, England, have invented certain new and useful Improvements in Methods of Testing for or Detecting and Correcting Faults or Errors in Tubular Articles, of which the following is a specification.

This invention relates to a certain new and useful method of testing for or the detecting and correcting faults or errors in straightness in the bore of a gun or rifle barrel or other tubular article.

In the usual method of testing the bore of a gun or rifle barrel, tube, or the like for straightness the object is pointed toward a window or lighted opening along the top of which is fitted a black board having a straight lower edge. On looking through the barrel when pointed a few inches below the edge of the black board a shade or shadow will be observed along the lower part of the bore of the barrel, commencing at the end nearest to the light and extending as far back as the middle of the barrel. While looking through the bore the observer rotates the barrel, and by the shape or outline of the shadow he is able to judge whether the bore is straight or otherwise and the location of any faults or distortions that may occur. This method of testing is open to several objections, the principal of which are that it is not absolutely certain in its results and is entirely dependent for its success upon the skill and judgment of highly-trained operators.

Briefly described, the manner in which the faults or errors in the straightness in the bore of a gun or rifle barrel or other tubular article is detected and corrected is as follows: First, the article to be operated upon is extended in an oblique or inclined manner in a direction which points toward a window or other source of light. Second, the projecting upon the wall of the bore of the article annular alternating bands of light and shade, the effect and intensity in the appearance of the said light-bands being heightened by contrasting with the alternate and adjacent shade-bands. Thus the effect or appearance presented to the eye of an observer looking along the said bore from the back end is that of a number or continuous series of alternating light or luminous and dark rings or alternating bands or circles of black and white lying one within the other for a considerable distance along the said bore. Each individual ring or band of the series corresponds to a known and determinate portion in the length of the barrel when the barrel under test is straight and true throughout. Third, rotating the article, and should the article be out of true or in fault in respect of the parallelism of its walls at any part then the particular light or dark band which corresponds to the position of the fault will appear to be eccentric relative to the other bands, and this enables the observer to detect the inaccuracy and correct the same and enable the observer to detect the exact side or point in the circumference where the fault occurs, and, fourth, correcting the defective portion of the tubular article by exerting lateral pressure thereon.

To more fully describe the new and improved method of testing for or detecting and correcting faults or errors in the straightness of the bore of a gun or rifle barrel or other tubular article, reference is had to the accompanying drawings, which illustrate one form of an apparatus by which the method can be carried out.

Figure 1 of the accompanying drawings represents a side elevation of one form of combined barrel testing and correcting machine constructed and arranged in accordance with our invention, and Fig. 2 is a top side plan of the same. Fig. 3 shows an elevation of the back or eyepiece end of the stand on which the said machine or appliance is supported. Fig. 4 represents, upon an enlarged scale, an end view of the forward hollow center in which the light screen or mask is fitted. One form of screen for admitting alternating rings of light and shade is shown in this view fitted into the hollow or axial opening in the said center, and two other forms of screen for producing similar effects are represented separately in Figs. 5 and 6. Fig. 7 represents, upon a smaller scale than Fig. 4, an elevation of the front and back ends of the machine, but with the hollow centers and their supporting head-stocks being shown in longitudinal vertical section. Fig. 8 is an end view of the back or eyepiece center with its supporting head-stock. Fig. 9 represents a cross-sectional view of the appliance upon the dotted line $x$, Fig. 7, looking toward the forward head-stock and center. Figs. 10, 11, and 12 represent in end elevation, side elevation, and top side plan, respectively, the adjustable truing or straightening cramp with which the appliance shown in Figs. 1 and 2 is provided.

The same letters of reference indicate corresponding parts in the several figures of the drawings.

$a$ is an inclined or sloping base or bed plate rigidly supported upon braced standards $a'$ $a^2$ and provided at the upper and lower ends with hollow and stationary or non-rotatable centers $b$ and $c$, between which the barrels are pivotally supported, so as to admit of being rotated relative to the said stationary centers in such a position that the bore of the barrel is axially in alinement with the bores $b'$ $c'$ of the said hollow centers, the rearward one of which is mounted in a fixed head-stock $b^2$, while the other center, which is located at the elevated end of the bed and nearest to the source of light, is carried in adjustable head-stock $c^2$, capable of longitudinal adjustment upon the bed or table for the purpose of regulating the distance between the two centers to suit different lengths of barrels and for advancing and retiring the said center for securing and releasing a barrel in and from its position. This adjustment and affixing and releasing of the forward head-stock and center may be effected by means of a traversing screw $d$, mounted in suitable bearings on the under side of the table and provided at the rearward or operator's end of the machine with a hand-wheel $d'$, while the screwed part of the same is directed through a trunnioned screw-box $d^2$, attached to the under side of the said head-stock, which has in connection with it a spring $c^3$ for steadying the motion and assisting in adjustment of the forward center away from the back center, it being understood that in every case the barrel is secured between the supporting-centers in such a manner as will admit of the same being freely rotated by the operator during the time that the bore is being inspected through the eyepiece-aperture or hollow of the back center.

In the arrangement shown in the drawings the screen or disk $e$, with the opaque and transparent parts, is mounted inside the bore of the forward center, to which it is fixedly or detachably secured in any convenient manner, so that it is interposed between the bore of a barrel mounted between the centers of the source of light, so that the whole of the light admitted into the fore end of the bore has to pass through the transparencies of the screen.

$f$ is the adjustable cramp or press provided for the purpose of applying lateral pressure to the outer walls of a barrel and springing the same at the point or points where a fault or inaccuracy in the bore may have been found by test to exist for the purpose of rectifying same. The said cramp is mounted upon a slide-rest $g$, which admits of being traversed or pushed by the hand of the viewer to any point petween the centers where it may be required, and the particular construction shown in the drawings consists of a fixed jaw $f'$ and a movable jaw $f^2$, which is adjustable laterally along a transverse slide $f^3$ by means of a screw $f^4$, to the stem $f^5$ of which a hand-wheel, key, or lever may be fitted to enable the desired amount of lateral pressure being applied at the desired points in the length of the barrel, such applications of pressure being continued until the operator ascertains that the whole of the rings of light and shade reflected within the bore are perfectly concentric and remain so when the barrel is rotated between its centers. The opposed faces of the jaws are provided at $f^6$ $f^7$ $f^8$ with grooves or channels to form separated seatings for the parts of the barrel to which the pressure is to be applied.

Having fully described our invention, what we desire to claim, and secure by Letters Patent, is—

1. A method of testing the straightness of gun-barrels and other tubular articles, consisting in the production and projection or admission into the smooth and polished bore of the barrel or article of alternating lights and shadows which are reflected by the cylindrical surface of the said bore and are thereby made to present, to the eye of a viewer looking up the bore from the end farthest removed from the source of light, the appearance of a plurality of alternating rings or bands of light and shade whose concentricity or relative positions is an indication of the truth or straightness of the bore.

2. A method of testing and correcting the straightness of gun-barrels and other tubular articles, consisting in the production and projection or admission into the smooth and polished bore of the barrel or article of alternating lights and shadows which are reflected by the cylindrical surface of the said bore and are thereby made to present, to the eye of a viewer looking up the bore from the end farthest removed from the source of light, the appearance of a plurality of alternating rings or bands of light and shade whose concentricity or relative position is an indication of the truth or straightness of the bore, and then subjecting the faulty portion of said article to lateral pressure to correct it.

3. A method of testing and correcting the straightness of gun - barrels and other tubular articles by interposing between the bore of the said barrel or article and a source of light a mask to form or produce shadows, or alternating lights and shades, which are reflected along the smooth and polished cylindrical surface of said bore in such a manner as to present to the eye of a viewer looking up the bore from the end farthest removed from the source of light the appearance of a plurality of alternating lights and shadows, or alternating rings or bands of light and shade whose relative positions—when the barrel is rotated—afford an indication of the straightness or otherwise of the barrel or article and of the location of a fault or faults should such be present in the said article, and then subjecting the faulty portion of said article to lateral pressure to correct it.

In testimony whereof we have hereunto set our hands in presence of two subscribing witnesses.

AUGUSTUS HENRY MURRAY DRIVER.
GEORGE NORMAN.

Witnesses:
ARTHUR SADLER,
HARRY PRATT.